United States Patent [19]
Roes et al.

[11] Patent Number: 4,587,434
[45] Date of Patent: May 6, 1986

[54] CURRENCY NOTE VALIDATOR

[75] Inventors: John B. Roes; Billy B. Winkles, both of San Diego; Guy M. Kelly, La Jolla; Wayne M. Spani, San Diego; Donald W. Schuster, Ramona, all of Calif.

[73] Assignee: Cubic Western Data, San Diego, Calif.

[21] Appl. No.: 761,659

[22] Filed: Jul. 31, 1985

Related U.S. Application Data

[63] Continuation of Ser. No. 596,661, Apr. 4, 1984, abandoned, which is a continuation of Ser. No. 313,809, Oct. 22, 1981, abandoned.

[51] Int. Cl.[4] .............................................. G06K 5/00
[52] U.S. Cl. ...................................... 250/556; 356/71
[58] Field of Search ............. 250/556, 223 R; 356/71; 209/534; 382/7, 17, 18

[56] References Cited

U.S. PATENT DOCUMENTS

| | | | |
|---|---|---|---|
| 4,075,604 | 2/1978 | Degasperi | 382/18 X |
| 4,184,081 | 1/1980 | Bergamini | 250/556 |
| 4,204,765 | 5/1980 | Iannadrea et al. | 356/71 |
| 4,303,832 | 12/1981 | Ehrat | 250/556 |
| 4,311,914 | 1/1982 | Huber | 250/556 |
| 4,319,137 | 3/1982 | Nakamura et al. | 250/556 |
| 4,381,447 | 4/1983 | Horvath et al. | 250/223 R |
| 4,386,432 | 5/1983 | Nakamura et al. | 382/7 |

*Primary Examiner*—Edward P. Westin
*Attorney, Agent, or Firm*—Brown, Martin & Haller

[57] ABSTRACT

A microprocessor controlled currency note validator includes a transport for propelling an inserted note longitudinally past an optical scanning station. Infrared and visible color reflectance readings and opacity readings are taken along several longitudinally extending tracks on the note. The microprocessor normalizes the reflectance readings to accommodate for variations in soiling and compares the normalized reflectance readings and the opacity readings against stored acceptance band data, correcting for pattern registration variations if necessary. The length of the note is also checked and a validation signal is provided if the note passes the optical tests and the length test. During the idle cycle, the microprocessor automatically adjusts the optical circuitry to compensate for component drift and dirt buildup. The microprocessor also provides a visual display of any detected malfunctions.

10 Claims, 10 Drawing Figures

Microfiche Appendix Included
(1 Microfiche, 73 Pages)

CURRENCY NOTE VALIDATOR

CROSS REFERENCE TO RELATED PATENTS AND APPLICATIONS

This is a file wrapper continuation of application Ser. No. 596,661, filed Apr. 4, 1984, which is a continuation of application Ser. No. 313,809, filed Oct. 22, 1981, both now abandoned.

This application is related to U.S. Pat. Nos. 4,357,530; 4,365,718; 4,367,666; 4,374,564; 4,376,942; 4,377,828; and 4,381,705 having the same Assignee as this application. This application is also related to co-pending U.S. patent application Ser. No. 477,745 filed Mar. 23, 1983 entitled "Stepper Motor Control Circuit," inventor Charles L. Hayman now U.S. Pat. No. 4,459,527, which was a Continuation of Ser. No. 211,026 filed Dec. 1, 1980 assigned to the same assignee as this application and now abandoned. This application is further related to co-pending U.S. patent application Ser. No. 211,014 filed Dec. 1, 1980 entitled "Static Diverter Module" inventor Gregory E. Miller and assigned to the same assignee as this application now U.S. Pat. No. 4,416,378.

The specification includes a computer program listing in the form of a microfiche appendix consisting of one total number of microfiche and a total number of 73 frames.

BACKGROUND OF THE INVENTION

The present invention relates to automated devices for validating currency .

In many commercial transactions involving automated equipment, it is necessary to provide an apparatus for validating the authenticity of a currency note submitted by a patron. For example, in mass transit systems employing automatic fare collection equipment, it is necessary for the automatic ticket dispensing apparatus to validate paper currency inserted by patrons before dispensing tickets having fares encoded thereon.

The co-pending U.S. patent applications listed above disclose modules which may be interconnected in various ways to provide ticket dispensing equipment, entrance gates, and exit gates for a mass transit system. The currency note validator disclosed herein constitutes an additional module which may be utilized in conjunction with the foregoing modules. The apparatus described herein may also be utilized in conjunction with a wide variety of other automated systems which accept payment in the form of paper currency in return for goods or services.

SUMMARY OF THE INVENTION

It is a principal object of the present invention to provide a currency note validator apparatus which will accommodate large variations in the soiling of notes so that a very high percentage of valid notes will be accepted while counterfeit notes will be rejected.

Another object of the present invention is to provide a currency note validator apparatus which checks the optical reflectance, optical opacity, and length of a note.

Another object of the present invention is to provide a curency note validator apparatus which will accommodate aging and drift in its electronic components.

Another object of the present invention is to provide a currency note validator apparatus which will accommodate pattern registration variations on valid notes.

Another ojbect of the present invention is to provide a microprocessor controlled currency note validator apparatus.

Another object of the present invention is to provide a currency note validator apparatus capable of validating notes inserted in any one of four orientations.

Another object of the present invention is to provide a currency note validator apparatus which takes various optical measurements in regard to an inserted note and compares them to preprogrammed acceptance band data.

Another object of the present invention is to provide a currency note validator apparatus which may be readily programmed to validate different types of currency notes.

Another object of the present invention is to provide a currency note validator apparatus capable of communicating with, and responding to, commands from the central controller of a larger system incorporating the validator apparatus.

Another object of the present invention is to provide a currency note validator apparatus which will locate malfunctions therein and display an indication of the malfunctions.

The illustrated embodiment of the present invention comprises a microprocessor controlled currency note validator which will accept valid currency notes for any type of currency for which it is configured and programmed. The apparatus includes a tranpsort for propelling the note along a path beneath an optical scanning station where both infrared and visible color reflectance readings are taken along several tracks down the length of the note. Optical opacity readings are also taken along a track down the length of a note. The microprocessor normalizes the reflectance readings to accommodate variations in the soiling, discoloration, and damage in circulated currency notes. The microprocessor then compares selected reflectance readings and opacity readings against preprogrammed acceptance band data for the type of currency note to be validated, correcting for note-to-note pattern registration variations.

Because a large number of locations are tested on the note and acceptability is determined by a statistical criterion, a note with one or two discolored or damaged areas, as well as a note with a pattern registration variation can still be accepted. In addition to the optical testing, the apparatus also checks the length of each note. Invalid or counterfeit notes are returned to the patron through an entry slot.

During the idle cycle of the currency note validator apparatus, the microprocessor continuously monitors the various systems within the apparatus, checking for malfunctions. If a failure is discovered, the microprocessor places the validator apparatus out-of-service, and a special panel of flashing indicators displays in code the reason for the out-of-service condition. During the idle cycle, the microprocessor also checks and readjusts drive currents in the optical subsystem. This self-calibration automatically compensates for the effects of component aging and dirt buildup on optical surfaces.

The design of the currency note validator apparatus makes it readily adaptable to different types of currencies. The best reading locations and appropriate acceptance band data are determined in advance by collecting and analyzing optical data from large samples of currency notes. The acceptance band data and the best reading locations are stored in a program memory in the apparatus. The illustrated embodiment of the present invention is capable of processing a currency note in less than two seconds while providing a valid note acceptance rate above ninety-five percent.

DESCRIPTION OF THE PREFERRED EMBODIMENT

Figure 1:
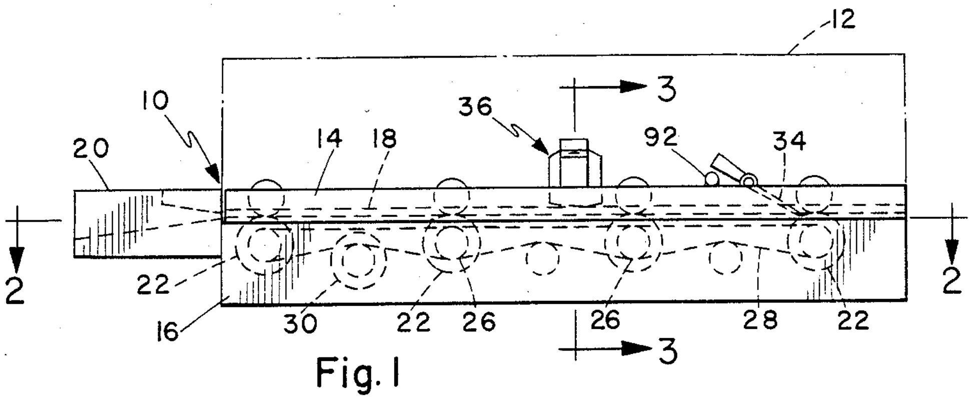
FIG. 1 is a simplified side elevation view of a preferred embodiment of the apparatus illustrating mechanical components of its note transport in phantom lines.

The general mechanical construction of a preferred embodiment of the currency note validator apparatus of the present invention is illustrated in FIGS. 1-5. Referring to FIG. 1, the apparatus 10 includes a rectangular housing 12 divided into an upper portion shown in phantom lines and a lower portion shown in solid lines. The apparatus 10 includes transport means for propelling the note along a longitudinally extending path past an optical scanning station.

Upper and lower horizontal, rectangular plates 14 and 16 (FIGS. 1-3) are mounted in the housing 12. The upper plate 14 is mounted to the bottom of the upper portion of the housing 12. The lower plate 16 is mounted in the top of the lower portion of the housing 12. The plates 14 and 16 are hinged on one side (not shown). The upper plate 14 and the upper portion of the housing 12 may be swung open from their closed positions illustrated in FIG. 1 to allow direct access to the channel 18 defined between the plates. This permits easy maintenance and cleaning. The electronic circuitry of the apparatus which is hereafter described is carried by PC boards removably mounted in the upper portion of the housing 12.

Figure 2:
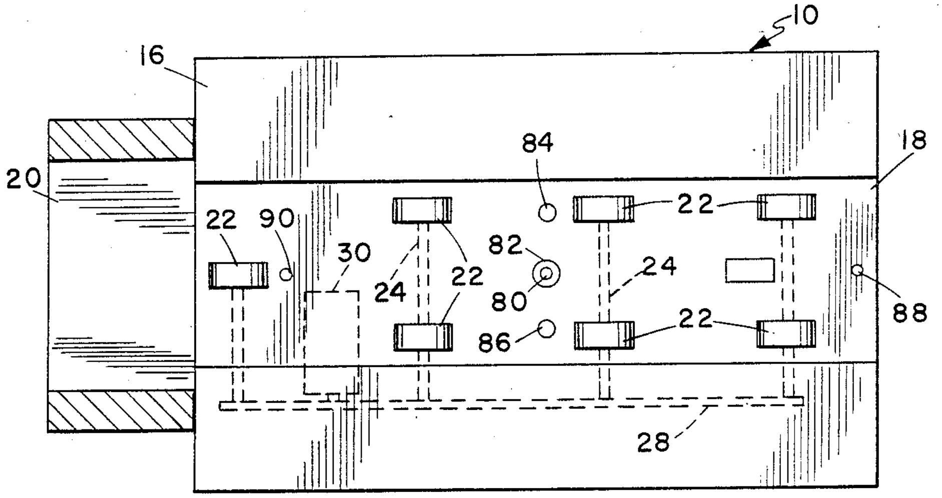
FIG. 2 is a horizontal sectional view of the apparatus of FIG. 1 taken along line 2—2 of FIG. 1.
Figure 3:
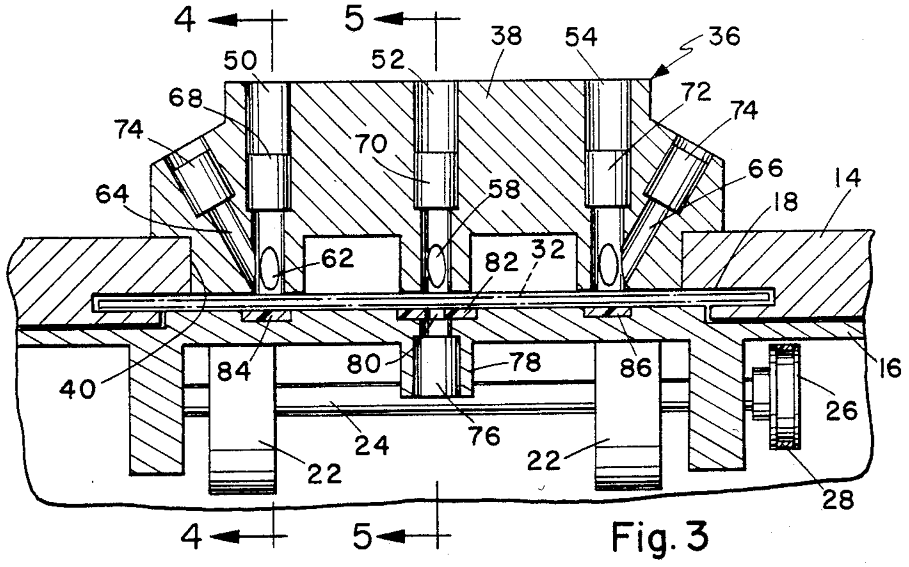
FIG. 3 is an enlarged vertical sectional view of the optical scanning station of the apparatus of FIG. 1 taken along line 3—3 of FIG. 1.

The channel 18 (FIG. 1) defines a longitudinally extending path through which a currency note is propelled. The currency note is inserted into a bezel 20 (FIG. 1) which has converging upper and lower surfaces shown in phantom lines for feeding the note into the channel 18. The note is propelled through the channel by resiliently biased, opposing pairs of upper and lower rollers 22. The rollers extend into the channel 18 through slots formed in the plates 14 and 16 and are mounted on axles 24 (FIGS. 2 and 3). The axles each have pulleys such as 26 (FIG. 3) mounted on the ends thereof. An endless belt 28 (FIGS. 1 and 2) engages each of the pulleys 26, one of which is mounted on the drive shaft of an electric motor 30. The motor 30 is energized to drive the rollers and propel the note longitudinally through the channel 18 from left to right in FIGS. 1 and 2.

A note 32 is shown in phantom lines in FIG. 3 positioned within the channel 18 defined between the plates 14 and 16. By way of example, the motor 30 may be a normal-slip AC motor which generates a transport speed of approximately 21.6 centimeters per second at 60 Hz. The channel 18 may have a height of approximately one millimeter.

A small plastic hook 34 (FIG. 1) extends downward into the rear portion of the channel 18 through a hole in the upper plate 14. This hook does not impede forward movement of the note 32 (left to right in FIG. 1) but will prevent the note from being pulled rearwardly out of the apparatus (right to left in FIG. 1) with a string after the note has been "cashed".

Preferrably, the transport means is capable of accommodating the various widths of currency notes used around the world. For example, one of the largest currency notes is the Hong Kong ten dollar note, which is 84 millimeters wide. The upper and lower plates 14 and 16 may be fabricated with a channel having this width. Lesser width notes can then be handled by mounting guide rails (not shown) at appropriate locations on either side of the channel, and by substituting a different entrance bezel having a throat with the appropriate width.

FIG. 3 illustrates the optical scanning station 36 which is positioned intermediate the length of the channel 18. The optical scanning station includes an optical block 38 mounted in a transversely extending aperture 40 formed in the upper plate 14. The optical block 38 serves as a mounting platform for the emitter means and the detector means utilized in making the optical reflectance and optical opacity measurements which are performed by the apparatus. Preferbly, the optical block is mounted so that it can be adjusted up and down by means of spring loaded screws (not shown). This will enable the block to be lowered sufficiently to produce a smoothing and flatening effect on the note, without increasing the likelihood of a jam.

Figure 6:
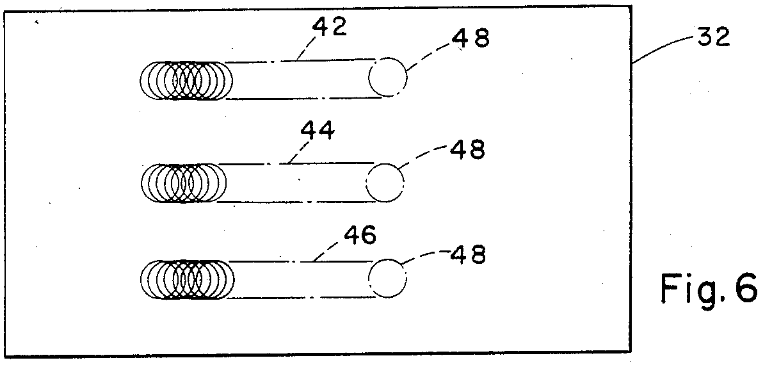
FIG. 6 is a diagrammatic view illustrating a plurality of longitudinally extending, laterally spaced tracks on a currency note, each consisting of a plurality of sample areas from which optical reflectance readings have been taken.

As the note 32 (FIG. 3) is propelled beneath the optical scanning station 36, optical reflectance readings are taken along three laterally spaced tracks 42, 44 and 46 (FIG. 6) down the length of the note. As explained hereafter in greater detail, each of the tracks is formed of a plurality of circular sample areas 48 which are momentarily illuminated by the pulsing of corresponding emitter means mounted in the optical block 38. The circular sample areas 48 in each track overlap each other since the pulse time is extremely short in comparison to the speed of movement of the note 32.

Figure 4:
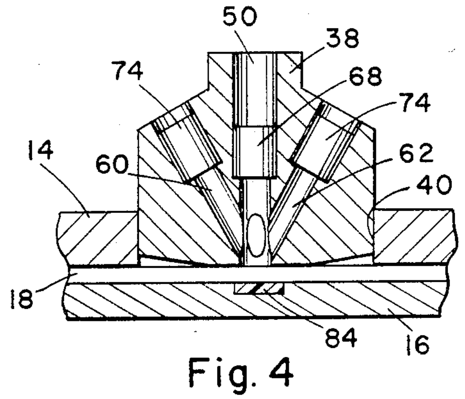
FIG. 4 is a vertical sectional view of the optical scanning station taken along line 4—4 of FIG. 3.
Figure 5:
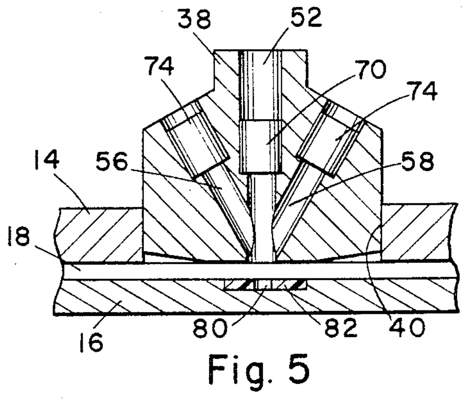
FIG. 5 is a vertical sectional view of the optical scanning station taken along line 5—5 of FIG. 3.

The construction of the optical block 36 is illustrated in FIGS. 3-5. Three laterally spaced vertical tunnels 50, 52 and 54 (FIG. 3) extend through the optical block 38. Two inclined tunnels 56 and 58 (FIG. 5) converge and intercept the lower end of the center vertical tunnel 52. Two inclined tunnels 60 and 62 (FIG. 4) converge and intercept the lower end of the end one of the vertical tunnels 50. Two inclined tunnels also converge and intercept the lower end of the other vertical tunnel 54. In addition, inclined tunnels 64 and 66 (FIG. 3) converge and intercept the lower ends of the vertical tunnels 50 and 54, respectively.

Three separate photodetectors 68, 70 and 72 (FIG. 3) are each mounted in corresponding ones of the vertical tunnels 50, 52 and 54 in the optical block 38 and are oriented for receiving radiation reflected from the lower plate 16 or the note 32 beneath the optical block. Preferably, the photodetectors are PIN diodes operated in the photoconductive mode.

Light emitting diodes (LEDs) 74 (FIGS. 3–5) are mounted in each of the inclined tunnels which extend through the optical block 38. They illuminate the note 32 (FIG. 6) along the three tracks 42, 44 and 46 as the note is propelled past the optical scanning station 36. Two LEDs 74 simultaneously illuminate the note along the center track 44. At a different time three LEDs 74 simultaneously illuminate the track 42. Thereafter three LEDs 74 simultaneously illuminate the track 46. Preferably, the LEDs 74 each illuminate the note at an angle of between approximately 25 degrees and 40 degrees. The LEDs on a given track preferably have their optical output intensities matched to within 25 percent. It will be understood that when the LEDs 74 for a particular track are pulsed with a suitable drive signal, they will illuminate a circular area 48 (FIG. 6) on the note. At the same time, the particular pin diode associated with that track will receive radiation reflected from that circular area on the note and provide an output or read signal whose amplitude represents the intensity of the reflected radiation.

Special inks are used in the production of most currency notes, and their reflectances at a particular point in the spectrum are difficult to duplicate in printed counterfeit notes or photocopies. Preferably, the LEDs for a particular track illuminate the note in a preselected narrow spectral range. In addition, it is preferable for different tracks on the note to be illuminated with radiation in the visible and infrared ranges. By way of example, where the note validator apparatus is configured to validate a British one pound currency note, infrared LEDs with a peak wave length of approximately 940 nanometers may be used on the two outside tracks. "Green" LEDs with a peak spectral output at approximately 565 nanometers may be used on the center track 44.

Each of the LEDs emits radiation in a very narrow spectral range. When the LEDs for a track are pulsed with a suitable drive signal, the amplitude of the read signal generated by the associated pin diode represents a reflectance image of a particular circular sample area 48 on the note at a particular point in the spectrum. In order to achieve sufficient intensity of illumination, preferably all of the diodes associated with a particular track are pulsed simultaneously. The light is reflected upward from the surface of the note to the associated pin diode located directly above the sample area of illumination. In addition, the diodes for the respective tracks are pulsed sequentially so that the tracks are separately illuminated. Thus, for example, the center one of the pin diodes will receive only reflected radiation originating from the center ones of the LEDs 74 and not from the LEDs mounted at either end of the optical block 38. Each one of the pin diodes generates read signals indicating the optical reflectance of a sample area on the note at a particular point in the spectrum. The design of the apparatus must be such that a minimum amount of stray light reaches the transport channel 18 at the optical scanning station 36 where the optical measurements are performed.

Tests have indicated that a circular sample area having a diameter of approximately five millimeters is sufficiently large to reduce scatter in the readings due to pattern registration variations, yet is small enough to provide sufficient optical resolution from gross pattern recognition. In the case of a British one pound note, a total of approximately 120 optical reflectance readings may be taken on each of the tracks 42, 44 and 46. The LED pulse time may be approximately 200 microseconds, for example. The distance travelled by the note during the 200 microsecond pulse time is negligible compared to the total sample area.

The currency note validator apparatus 10 is further provided with means for taking a plurality of opacity readings on the note. In the illustrated embodiment, optical transmission measurements are taken along the center track 44 only. This is done in addition to the optical reflectance readings which are taken along all three tracks. To facilitate the taking of opacity readings, a single infrared emitting diode 76 (FIG. 3) is mounted in a cylindrical housing 78 formed on the underside of the lower plate 16. Infrared radiation emitted from the diode 76 is transmitted through an aperture 80 in the center of the lower plate 16 and through the central hole of a plastic reference surface ring 82. This infrared radiation passes through the center track 44 on the note 32 and is received by the pin diode 70 mounted directly above the infrared emitting diode 76. The reference surface ring 82 is mounted in a circular recess formed in the lower plate 16 so that it is flush with the upper surface of that plate and does not impede forward movement of the currency note.

The infrared emitting diode or IRED 76 (FIG. 3) and the pin diode 70 are initially used to detect the leading edge of the note at the scanning station 36. In addition, by pulsing the infrared emitting diode with a suitable drive signal in an appropriate sequence during the collection of the reflectance read signals generated by the pin diodes, transmission or opacity readings can be made along the center track of the note. When the infrared emitting diode 76 is pulsed, the amplitude of the signal generated by the pin diode 70 provides an indication of the amount of radiation transmitted through the note at that particular point.

Reference surface disks 84 and 86 (FIG. 3) are also flushly mounted in the lower support plate 16 directly beneath the pin diodes 68 and 72. The location of the reference surface ring 82 and of the reference surface disks 84 and 86 is also illustrated in FIG. 2. Preferably, they are made of a durable, white colored plastic material such as that sold under the trademark DELRIN. The reference surfaces are utilized in a self-calibration procedure performed by the apparatus which is described hereafter in greater detail. When a note is not present at the optical scanning station 36, the LEDs for the tracks are sequentially pulsed and the radiation emitted thereby is reflected back to the pin diodes by corresponding ones of the white reference surfaces 82, 84 and 86. The reference signals generated by the pin diodes are then compared with stored data and the gain of certain amplifiers which generate the LED drive signals is adjusted.

The detailed reflectance spectrum of the reference surfaces is not critical since they are used only to adjust the LED drive currents. The reference surfaces are not directly involved in the analysis of the reflectance data from a note. The reflecting surfaces of the reference ring 82 and of the reference disks 84 and 86 are preferably bead blasted in order to provide non-specular reflection.

The currency note validator apparatus of the present invention is further provided with means for measuring the length of the note. The note length measurement is performed by timing the passage of the leading edge of the note from the scanning station to an exit sensor 88 (FIG. 2), and by timing the complete passage of the full length of the note under the scanning station. The ratio of these two time periods, multiplied by the known distance from the scanning station to the exit sensor yields the length of the note. The result is compared with upper and lower limits stored in a program memory as hereafter described. The exit sensor 88 may consist of an infrared emitting diode (not shown in FIGS. 1–5) mounted in the lower plate 16 and transmitting radiation to a phototransistor (not shown in FIGS. 1–5) mounted directly above in the plate 16.

An entrance sensor 90 (FIG. 2) may be mounted at the forward end of the transport means. It detects the leading edge of the note to indicate the insertion of a note. A sensor 92 (FIG. 1) detects pivotal movement of the hook 34 to indicate that a note has passed the hook. The sensors 90 and 92 may also comprise IRED-phototransistor pairs.

Figure 7:
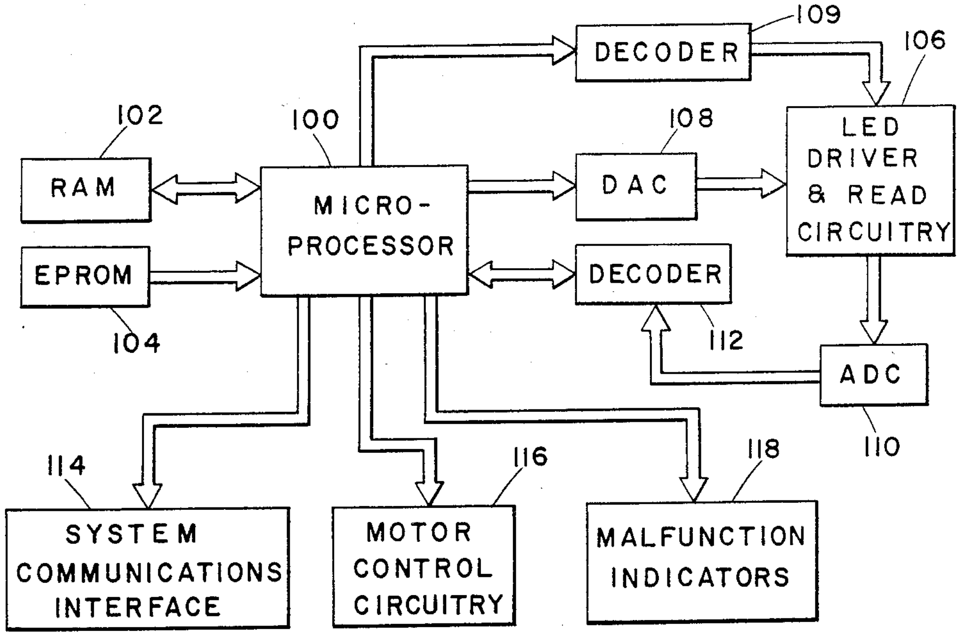
FIG. 7 is a functional block diagram of the electronic control circuit of the apparatus of FIG. 1.

FIG. 7 illustrates a functional block diagram of the electronic control of the currency note validator apparatus 10. It includes a microprocessor 100 which may be an INTEL 8039 microprocessor. The microprocessor is provided with an external RAM 102 for optical data storage. The RAM 102 may comprise two P 2114-3 RAM chips providing 1K bytes of memory. The microprocessor 100 is also provided with a permanent memory in the form of an EPROM 1204 for storing the operational program of the apparatus hereafter described. By way of example, the EPROM 104 may comprise two type B 2716-1 EPROM chips providing 4K bytes of program memory. A type 74LS273 latch chip (not shown) may be used as an interface between the microprocessor 100 and the memories 102 and 104.

Figure 8:
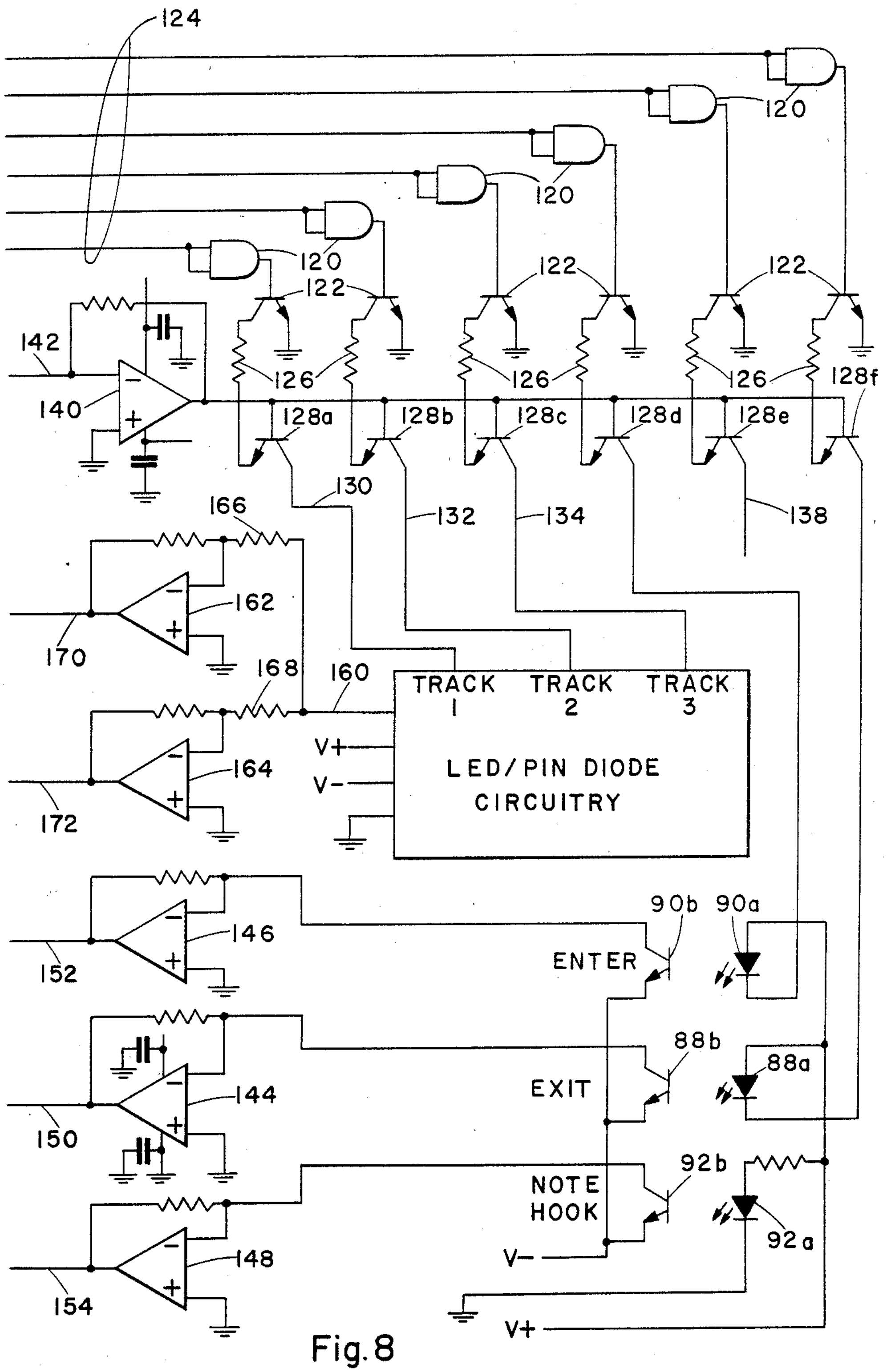
FIG. 8 is a schematic diagram of a portion of the optical driver and read circuitry of the control circuit of FIG. 7.

LED driver and read circuitry 106 (FIG. 7) is utilized by the microprocessor 100 for selecting and driving the LEDs, and for amplifying the PIN diode outputs. A digital to analog converter or DAC 108 is used by the microprocessor to adjust the amplitude of the LED drive currents. A decoder 109 hereafter decribed in conjunction with FIG. 8 is utilized by the microprocessor to sequentially pulse the LEDs for each track. The outputs from the PIN diodes are amplified and then passed through an analog to digital converter or ADC 110 and a decoder 112 to the microprocessor. The microprocessor performs the analysis of the data hereafter described which is necessary to determine whether the note can pass the optical reflectance and optical opacity tests. The DAC 108 may be a type mc 1408 chip. The ADC 110 may be a type ADC 808 chip.

The microprocessor 100 may be provided with a system communications interface 114 (FIG. 7) for enabling the currency note validator to communicate with and respond to commands from the central controller of a larger system incorporating the validator apparatus. For example, in an automatic ticket dispensing machine for a mass transit system, the currency note validator apparatus may be one module which operates the other modules in the ticket dispensing operation. All of the modules may be controlled by a central controller in the form of a microprocessor. By way of example, where the microprocessor 100 of the currency note validator apparatus 10 is an INTEL 8039 microprocessor, pins P14–P17 along with the interrupt pin are available for external communications. In simpler applications, separate high-low output signals on these pins may represent status conditions such as "note being checked", "note valid", "note cashed", and "out-of-service". Input signals may represent "cash note", "reject note", or "block all notes" commands. In more sophisticated applications, a software USART with two-way communications capability can be provided.

The electronic circuitry of the illustrated embodiment of the currency note validator further includes motor control circuitry 116 (FIG. 7) which enables the microprocessor 100 to operate the motor 30 (FIG. 2) of the transport means as required to propel the note. By way of example, the motor control circuitry may include two solid state relays (not shown) for activating the motor in either the forward or reverse direction. These relays may be controlled by the microprocessor. The motor is energized to propel the ticket forwardly past the optical scanning station in order to perform the optical and size tests necessary to determine if the note is valid. If an invalid note is determined, the motor is driven in the reverse direction to eject the note out of the entry bezel 20.

Finally, the control circuit of the note validator apparatus includes a plurality of malfunction indicators 118. As described hereafter in greater detail, during and idle cycle of the apparatus, i.e., when no note is present in the transport means, the microprocessor continuously checks for system malfunctions. Upon locating a system malfunction, an indication of the particular malfunction is given on a display which may comprise a plurality of LEDs (not shown) mounted on a panel secured to the housing 12 of the apparatus. There may be four such LEDs. By flashing certain ones of these LEDs according to a code, a specific malfunction may be indicated. If an INTEL 8039 microprocessor is used, a 75LS175 chip may provide the interface required between the microprocessor and the four indicator LEDs. When a system malfunction is located by the microprocessor, the microprocessor places the currency note validator apparatus out-of-service, indicating such a status condition through the systems communications interface 114. At the same time, the nature of the malfunction may be displayed by the malfunction indicators 118.

The decoder 109 (FIG. 7) may include a type 74LS174 chip (not shown) and six AND gates 120 (FIG. 8). The inputs of each AND gate are connected. The outputs of the AND gates are connected to the bases of corresponding NPN bipolar junction transistors 122. The AND gates 120 and the transistors 122 may be provided in the form of type 75452 chips. This provides a convenient two switch package. The gates 120 thus do not technically function as AND gates. The input leads 124 to the gates 120 may be connected to the respective Q pins of the aformentioned 74LS174 latch chip. The box in FIG. 8 labelled LED/PIN diode circuitry in FIG. 8 is shown schematically in FIG. 9. The collectors of the bipolar transistors 122 (FIG. 8) are each connected through resistors 126 to the emitters of corresponding NPN bipolar junction transistors 128*a* through 128*f*. The collectors of the transistors 128*a*, 128*b* and 128*c* are connected through leads 130, 132 and 134 to the LEDs 74 (FIG. 9) which illuminate the tracks 42, 44 and 46 on the currency note, respectively. The lead 136 (FIG. 9) is connected to a source of supply voltage V+ which in the illustrated embodiment is +12 volts. The collector of the bipolar transistor 128*e* is connected to the infrared emitting diode 76 through a lead 138 (FIG. 9).

The bases of the transistors 128*a–f* (FIG. 8) are connected to the output of an op amp 140. The inverting input of this op amp is connected through a lead 142 to the output of the DAC 108. The microprocessor 100 controls the gain of the op amp 140 via the DAC 108 and thereby adjusts the amplitudes of the drive currents provided by the transistors 128*a–f*. The output of the op amp 140 is applied to the bases of each of the drive transistors 128*a–f*. These transistors are turned on in sequence by the microprocessor utilizing the decoder 109 (FIG. 7) which includes the previously mentioned 74LS174 latch chip and the switches 120 and 122.

As previously mentioned, the sensors 88, 90 and 92 (FIGS. 1 and 2) detect the leading edge of note and the position of the hook 34. As illustrated in FIG. 8, each of these sensors may consist of a separate infrared emitting diode (IRED) such as 88*a* and a phototransistor such as 88*b*. The collectors of the driver transistors 128*d* and 128*f* are connected to one side of the IREDs 90*a* and 88*a* respectively. The other sides of these IREDs are connected to a supply voltage V+. The third one of the IREDs 92*a* is connected between ground and V+. The emitters of each of the phototransistors 88*b*, 90*b* and 92*b* are connected to a supply voltage V− and the collectors of these phototransistors are connected to the inverting inputs of corresponding op amps 144, 146 and 148. The positive or non-inverting inputs of these op amps are connected to ground. The output leads 150, 152 and 154 of the op amps 144, 146 and 148, respectively, are connected to the ADC 110 (FIG. 7). The output from each of the phototransistors 88*b*, 90*b* and 92*b* is amplified and then passed through a corresponding channel of the ADC to the microprocessor 100 for interpretation. Thus, for example, when the leading edge of the note reaches the location of the IRED-phototransistor pair 90 (FIG. 2), this is detected by the microprocessor. The same is also true when the leading edge of the note reaches the IRED-phototransistor pair 88 at the exit of the transport means. Also, when the hook 34 pivots up and backwardly, this breaks the beam of the IRED-phototransistor pair 92 (FIG. 1) which is indicated to the microprocessor by signals generated by the op amp 148 (FIG. 8).

Figure 9:
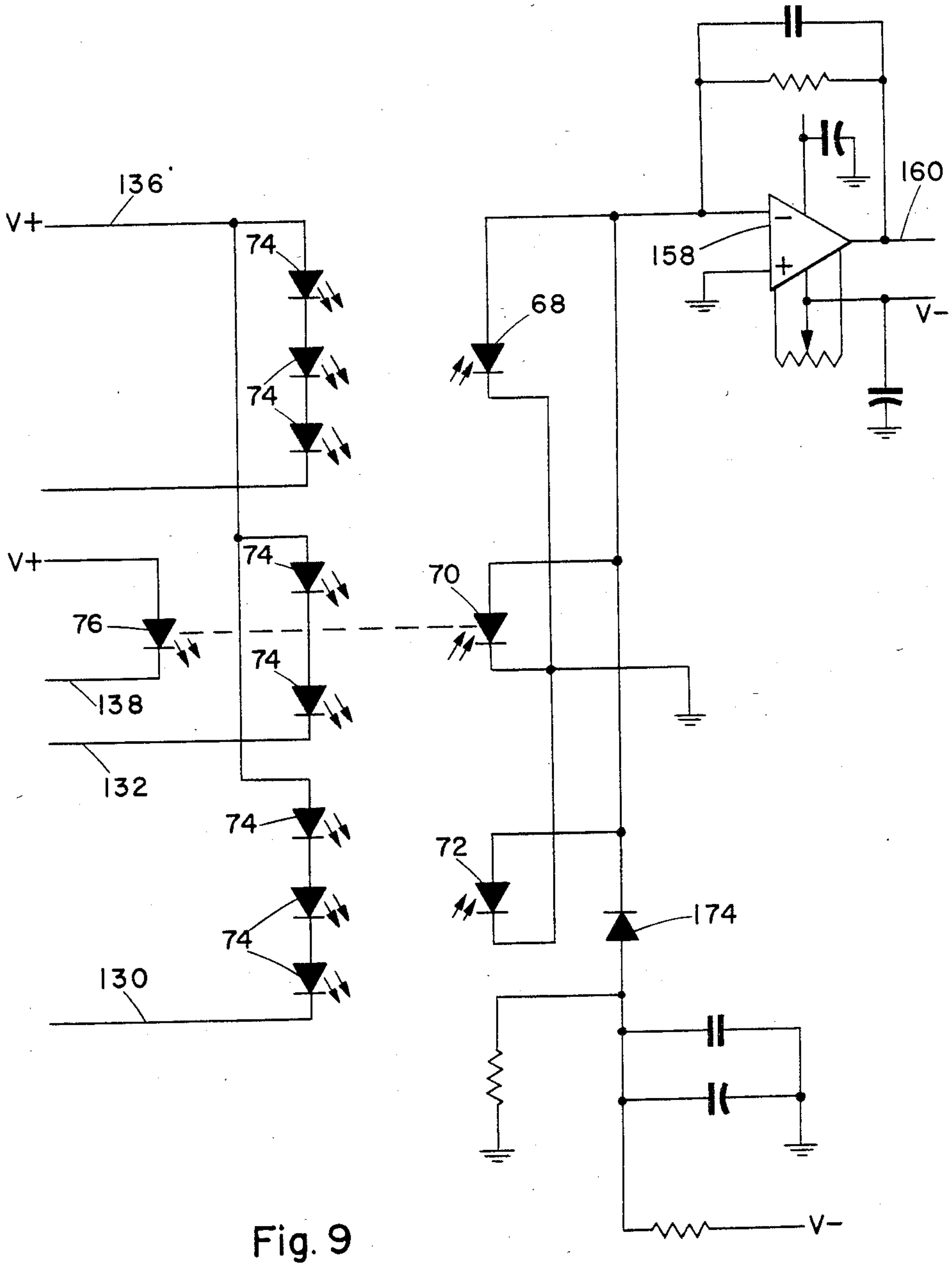
FIG. 9 is a schematic diagram of a portion of the circuit of FIG. 8 illustrating the innerconnection of the LEDs and PIN diodes mounted in the optical scanning station.

Details of the LED/PIN diode circuitry block of FIG. 8 are illustrated in FIG. 9. The PIN diodes 68, 70 and 72 detect the radiation reflected by the note by the reference surfaces. The PIN diodes are connected to the inverting input of an op amp 158 whose output lead 160 is in turn connected to the inverting inputs of op amps 162 and 164 (FIG. 8) through resistors 166 and 168. The output lead 160 (FIG. 8) has successive signals generated thereon corresponding to read signals for the first, second and third tracks. The output leads 170 and 172 of these op amps are connected to corresponding channels of the ADC 110 (FIG. 7) which permits the microprocessor 100 to interpret the amplitudes of the read signals generated by the respective PIN diodes. A diode 174 (FIG. 9) is connected to the PIN diodes 68, 70 and 72 and to a voltage source V− in order to compensate for dark current zero offset. The op amp 158 (FIG. 9) may be a type TL 081 chip. The op amps illustrated in FIG. 8 may be provided by TL 084 chips.

The resistor 168 may be 1K ohms and the resistor 166 may be 2K ohms, for example. This will make the op amp 164 a higher gain second stage amplifier with respect to the op amp 162. Thus, the op amp 164 will have sufficient gain for amplifying the outputs of the specific PIN diode which receives reflected infrared radiation. The amplitudes of the output signals generated by the infrared detecting PIN diode are significantly smaller than those of the PIN diodes which receive radiation in the visible spectrum.

Having described the general mechanical construction and electronic control circuitry of the illustrated embodiment, its operation can now be described. As already indicated, the principal basis for testing the validity of a currency note with the apparatus involves a spectral imaging process which tests the color fidelity of the note's printed design. After the note is inserted through the entry bezel into the transport, it is propelled beneath the optical scanning station where visible color and infrared reflectance readings are taken along the three tracks down the length of the note. The microprocessor compares selected ones of these reflectance readings against preprogrammed acceptance band data stored in the program memory. The operational program of the apparatus automatically corrects for dirty or soiled notes, and to some extent, corrects for note-to-note pattern registration variations. Because a large number of sample areas (for example 20 per track) are tested, a note with one or two discolored or damaged areas can still be accepted.

The microprocessor monitors the position detectors within the transport as the note is propelled therethrough in order to execute various portions of the operational program. For example, the position sensors are used to measure the length of the note, and to verify that the note has exited from the apparatus.

The use of a microprocessor in the apparatus enables the currency note validator to perform signicant self-diagnostic operations during its idle cycle. The microprocessor continuously monitors the various systems within the apparatus, checking for malfunctions. If a fault is discovered, the microprocessor places the apparatus out-of-service, and the nature of the fault is displayed in a code on an LED panel on the housing. Also, during the idle cycle, the microprocessor continuously checks and re-adjusts the outputs of the LEDs in the optical scanning system. This self-calibration automatically compensates for the effects of component aging and dirt build up on the reference optical surfaces.

An example of an operational program for the apparatus which may be stored in the EPROM 104 (FIG. 7) is set forth in source listing form in Table I and is entitled "BILL VALIDATOR APPLICATIONS PROGRAM". Table I is in the form of a microfiche appendix consisting of one total number of microfiche and a total number of 73 frames. Copyright in and to this program is claimed by the assignee of this application.

The microprocessor uses the operational program to control all aspects of operation of the apparatus, including note entry detection and note position monitoring, mechanical transport control, optical data collection and analysis, external communications, self-testing and self-calibration. The program set forth in Table I is specifically adapted for determining the validity of a British one pound note. As already mentioned, the apparatus can be modified to accept currency notes from various countries and in various denominations. The operational program of Table I has a modular structure, with each major sub routine comprising a self-contained unit. Each subroutine is headed by a list of all the variables and all memory space used by the routine. Where an INTEL 8039 microprocessor is utilized, the input/output specifications set forth hereafter in Table II may be utilized:

TABLE II

| | Port | Hex Address Select |
|---|---|---|
| Motor forward | P1 | X2 |
| Motor reverse | P1 | X4 |
| Motor off | P1 | X6 |
| D/A converter | P2 | 3X |
| A/D converter | P2 | 1X |
| LED switch select | P2 | 2X |
| External PAM | P2 | 0X |
| LED indicator panel | P1 | X1 |

Tables III and IV set forth the main routines and utility subroutines of the program of Table I.

TABLE III

1. Idle, Test and Calibration Routine
   A. Check Ram
   B. Check Position Sensors
   C. Perform Optical Calibration
   D. Check for Note Entry
   E. Check for Inhibit Signal from Host Electronics
   F. Idle
2. Note Entry Routine
   A. Turn on Motor
   B. Recheck Entrance Sensor
   C. Check for Note Arrival at Optical Block
   D. Check Width
3. Optical Data Collection
   A. Sequentially Pulse LED's, Read and Store Data, and Update Data Subtotals for Each Track
   B. Increment Data Count
   C. Check Position Sensor 4; Store Length Count
   D. Check for Automatic Cash: otherwise, Turn Off Motor
4. Data Analysis
   A. Compute and Check Length
   B. Check Average Opacity
   C. Normalize Reflection Data (Correct for Dirt)
   D. Correct for Speed
   E. Test Selected Readings against Acceptance Band, using Successive Data Shifts
5. Note Cashing
   A. Turn Motor On
   B. Verify Note Exit into Escrow
   C. Time Out Motor
6. Note Rejection
   A. Turn on Motor in Reverse
   B. Display Reason for Note Rejection
   C. Verify Note Exit
   D. Time Out Motor
7. Out-of-Service
   A. Display Reason for Out-of-Service Condition

TABLE IV

1. A/D Conversion
2. Multiply
3. Divide
4. Display

Figure 10:
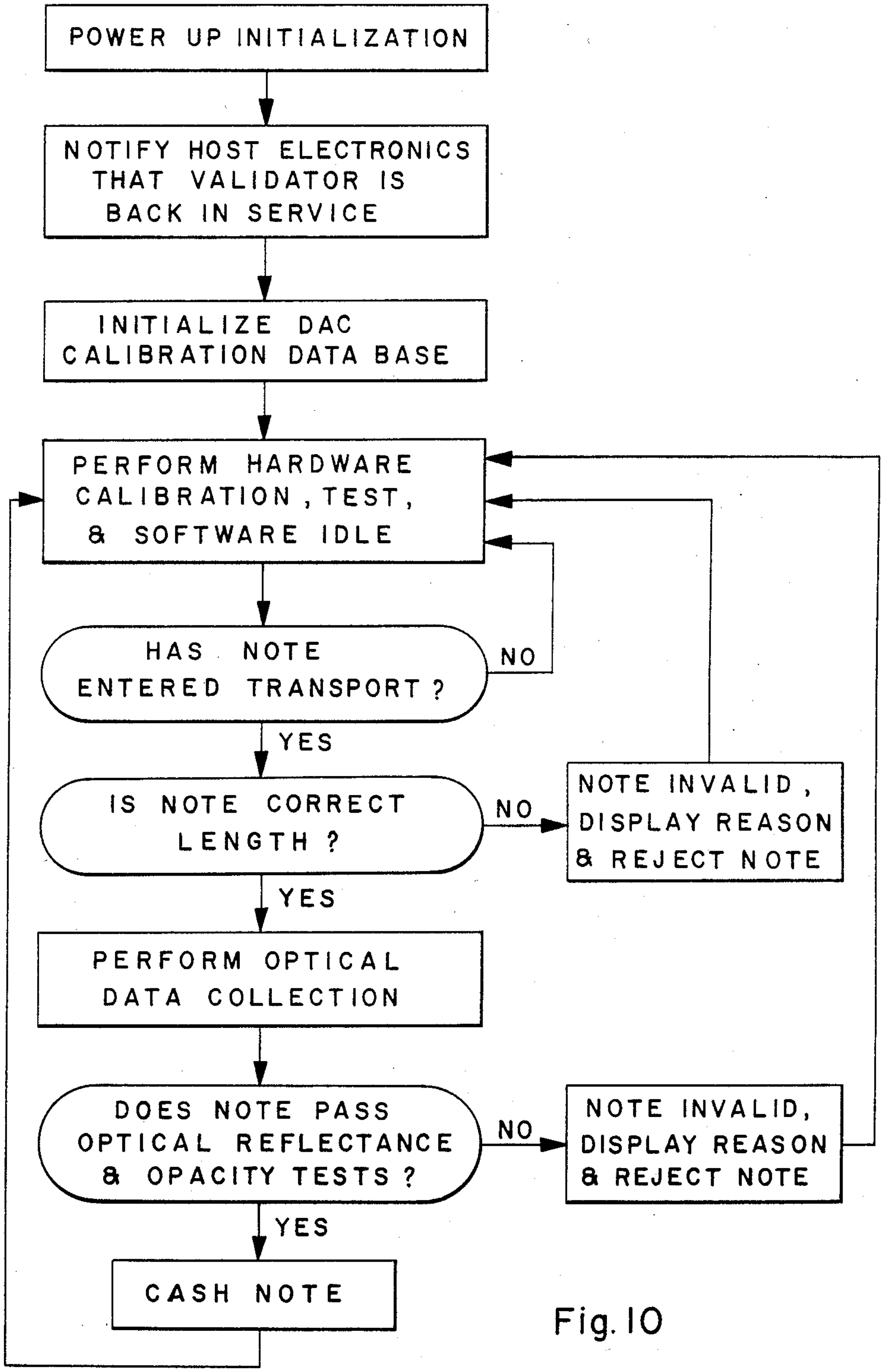
FIG. 10 is a flow chart of an operational program of the apparatus.

A flow chart of the operational program set forth in Table I is illustrated in FIG. 10.

When the note is being propelled under the optical scanning station, the microprocessor sequentially pulses the LEDs for each track in cylical fashion. The PIN diodes thus generate a plurality of read signals corresponding to each track, the amplitudes of the read signals representing the intensity of the color or infrared spectral reflectance of a particular circular sample area on the note. These read signals are converted into digital information which is stored in the RAM 102.

The analysis of the optical data is based on comparing the readings from a particular note with acceptance band data stored in the EPROM 104 as part of the operational program. The acceptance band data (image tables), which represents a "standard profile" of the type of currency not which is to be validated, is determined in advance by collecting data from a large sample of valid notes. The acceptance band data consists of upper and lower limits for the reflectance readings at a predetermined number of locations on each track, for example at twenty circular sample areas 48 (FIG. 6) for each track. Generally, the locations in each track are selected to be those which show the least scatter in the readings. Also, the locations which are to be tested are selected to be those which provide the best discrimination against photocopies.

The infrared emitting diode 76 (FIG. 3) which is underneath the note is also pulsed in sequence with the LEDs above the note so that at the same time the optical reflectance readings are being generated, the optical opacity readings are also being generated. For example, during one cycle, first all of the LEDs above a particular track on the note would be pulsed, thereafter all the LEDs above the next track would be pulsed, thereafter all the LEDs above the remaining track would be pulsed, and finally the infrared emitting diode beneath the note would be pulsed. Thereafter, the cycle would repeat itself. The signals generated by the PIN diode above the infrared emitting diode 76 are also converted into digital information representative of their intensity and are stored in the RAM 102. The actual reflectance and opacity readings collected for a note represent the raw data which much be processed before it can be compared to the acceptance band data. The reflectance readings and the opacity readings are processed differently.

The processing of the reflectance readings is as follows. First, each reflectance reading on a particular track is divided by the average of all the readings for that track. This normalization of the readings (accomplished in lines 511–554 on page 14 of the computer program lisiting in the microfiche appendix) brings the readings from a dirty note up to the same average level as those for a new note. Tests have indicated that this significantly reduces the scatter found in the readings from a large sample of notes. The normalized reflectance readings are then corrected for transport speed. As the optical reflectance readings are taken, the time required for the leading edge of the note to travel from the scanning block 38 to the sensor pair 88 (FIG. 2) is measured. A transport speed correction factor is computed from this measured time and known distance of travel, and is used to adjust data locations on the note (accomplished in lines 1021–1062 on page 25 of the computer program lisiting). Finally, preselected normalized reflectance readings are compared with their corresponding upper and lower limits in the stored acceptance band data, this "first comparison means" being accomplished in lines 783–850 on pages 20 and 21 of the computer program listing. Also, the spectral reflectances of different portions of the prnted pattern on a note are effectively compared with each other in lines 2448–2521 on pages 63 and 64 of the computer program listing, which compares each reading to the average of all the readings for a particular track, and compares this result with the stored acceptance band data. This relative reflection test eliminates the need for an independent spectral standard which would be difficult to reproduce or maintain. Successive data shifts of up to two locations are made in each direction along the length of a track in order to compensate for note-to-note pattern registration variations. In order for a note to pass as valid (match) under the optical reflectance test, there must be a particular longitudinal data shift for which there are no more than two locations per track at which the note's preselected normalized reflectance readings fall outside the acceptance band limits, and this "means for longitudinally shifting and for comparing" is automatically accomplished in lines 728–774 on page 19 of the computer program listing. Longitudinal data shifts are accomplished for each set of readings. The results are checked to determine the nonconformity of any particular shift compared to the image tables. After completion of the data shifts and comparisons, the best set of readings (the set with the least amount of nonconformity) is selected and compared with the acceptance criteria to see if there is a match.

Where it is required that a note be accepted when entered reverse and/or upside-down, then separate tables containing different acceptance band data for each different orientation in which the note can be entered are stored. The microprocessor must then execute the above analysis with respect to each orientation until a "match" is found. Accordingly, the note will pass the optical reflectance test if there is less than a predetermined maximum amount of non-conformity between the selected normalized read signals and the corresponding acceptance band data.

The normalization of the data, the speed correction, and the shifting of the data are techniques used to compensate for variations in the printing, cutting, and soiling of the notes, and tolerances in the mass production of the apparatus of this invention.

However, the fundamental test of a note's authenticity is the comparison of the reflectances of different areas of the note's printed surface with each other, using a spectrally-narrow light source. Because this test is relative, it elminates the need for an independent spectral reflectance standard, which would be difficult to reproduce or maintain in mass-production of the apparatus of this invention.

The comparison of the reflectances of difference areas of the note's surface (self comparison means and the generation of a self comparison validation signal) is accomplished by means of the combination of the data normalization (program lines 511–544), which relates each reading to the average of all the other readings, together with the "acceptance band" test (program lines 2448–2521), which sets upper and lower limits on the relative reflectance of each area tested.

The significance of this technique is that it enables economical mass-production of the apparatus, since there is no requirement for a precise reflectance standard. The use of a spectrally-narrow source is not essential, but generally improves discrimination since it provides a more specific test of the reflectance characteristics of the inks used in printing the notes.

Tests have indicated that there is too much scatter and too little dynamic range in the optical transmission readings to perform a reliable acceptance band test by comparing a plurality of the opacity readings against a plurality of corresponding upper and lower acceptance band limits. However, the opacity readings along the length of the note can be averaged, and the resulting average opacity can be compared with further acceptance band data in the form of upper and lower limits for the opacity which are stored in the program memory. Thus, the opacity test is also passed if there is less than a predetermined maximum amount of non-conformity. This provides discrimination against one-sided copies and against copies using paper of the wrong type or thickness.

When there is no note present beneath the optical scanning station, i.e., during the idle cycle, the LED drive current for each track is adjusted by monitoring the light reflected from the optical reference surfaces 82, 84 and 86 (FIG. 3) mounted below the optical block 38. When the LEDs for a particular track are pulsed on, the radiation is reflected from the reference surfaces to the corresponding PIN diode. The output of this PIN diode is compared against limits stored in the program memory. If the reading falls outside these limits, the microprocessor re-adjusts the LED drive current and the process is repeated. This self-calibration procedure (accomplished in lines 1334–1384 on page 33 of the computer program listing) automatically adjusts the optical outputs to correct for differences amount individual optical components and for dirt build-up on the optical surfaces. If the proper adjustment cannot be achieved, such as when one of the components has failed, then the microprocessor places the unit out-of-service.

Eventually, as dirt builds up on the optical reference surfaces, increasingly larger LED drive currents will be required to maintain the calibration. This means that the largest readings from the newer notes will begin to exceed the upper conversion limit of the ADC 110 (FIG. 7). If this occurs on any predetermined proportion of processed notes, for example twenty out of one-hundred consecutive notes, the microprocessor is programmed to place the bill validator apparatus out-of-service, and to provide an indication of this malfunction so that maintenance personnel will know that the reference surface need cleaning or replacing.

In an actual commercial embodiment of the present invention, the apparatus was capable of accepting greater than ninety-five percent of all valid notes while rejecting forgeries. The time required to process an individual note in the commercial embodiment did not exceed 2.0 seconds. The apparatus can be readily configured to validate various types of currency note by developing the required acceptance band data and inserting it into the operational program.

Having described a preferred embodiment of our currency note validator apparatus, it should be apparent to those skilled in the art that our invention may be modified in arrangement and detail. Therefore, the protection afforded our invention should be limited only in accordance with the scope of the following claims.

We claim:

1. An apparatus for validating a currency note, comprising:

transport means for propelling the note along a longitudinally extending path;

a plurality of emitter means positioned at laterally spaced locations along the path for each illuminating a sample area on the note with radiation in a preselected spectral range when pulsed with a drive signal;

a plurality of detector means for each sensing radiation reflected from a sample area illuminated by a corresponding one of the emitter means and for generating a read signal whose amplitude is proportional to the intensity of the reflected radiation sensed thereby;

means for sequentially pulsing the emitter means with corresponding drive signals as the note is propelled by the transport means to cause each emitter means to illuminate a plurality of longitudinally spaced sample areas defining a corresponding track on the note, and to cause the detector means to generate a plurality of read signals corresponding to each track;

means for storing predetermined acceptance band data for the type of currency not to be validated;

first comparison means for comparing selected ones of the read signals corresponding to each track to the acceptance band data and for providing a first validation signal if there is less than a predetermined maximum amount of nonconformity;

the first comparison means including means for dividing each read signal by the average of the read signals for its track to geanerate a plurality of normalized read signals corresponding to each track;

the predetermined acceptance band data consisting of upper and lower limits for the normalized read signals corresponding to preselected sample areas for each of the tracks;

the first comparison means determining if the normalized read signal corresponding to each preselected sample area falls within the upper and lower limits for that sample area and providing the first validation signal if less than a predetermined number of the normalized read signals fall outside their corresponding upper and lower limits;

means for longitudinally shifting the location of the selected ones of the read signals a predetermined number of positons to generate an alternate set of selected read signals corresponding to each track, for comparing the alternate set of selected read signals to the acceptance band data, and for providing the first validation signal if there is less than a predetermined maximum amount of nonconformity;

means for taking a plurality of optical readings along a longitudinally extending track on the note;

means for storing upper and lower acceptance limits for the opacity of the type of currency not to be validated;

second comparison means for comparing the average opacity reading to the upper and lower acceptance limits for the opacity and for providing a second validation signal if the average opacity falls within the upper and lower limits for the opacity;

means for measuring the length of the note;

means for generating a third validation signal if the length of the note falls within predetermined limits;

means for generating a pass signal if the first, second and third validation signals have been generated;

a plurality of reference surfaces each positioned along the path for sequentially pulsing the emitter means with the drive signals when a note is not present in the transport means to cause the detector means to generate reference read signals;

means for storing predetermined reference signal ranges; and third comparison means for comparing the reference read signals to the reference signal ranges and for adjusting the amplitudes of the drive signals so that the reference read signals fall within the reference signal ranges.

2. An apparatus according to claim 1 and further comprising means for determining and displaying a malfunction in the apparatus.

3. An apparatus according to claim 1 and further comprising an optical block connected to the transport means along the path past which a surface of the note is propelled, the optical block including a rigid block of material with a plurality of laterally-spaced vertical tunnels and a plurality of intercepting incline tunnels that house optical detectors and emitters in alignment with laterally-spaced tracks along the path.

4. An apparatus for validating a currency note, comprising:

transport means for propelling the note along a longitudinally extending path;

means for taking a plurality of optical reflectance readings along a plurality of longitudinally extending, laterally spaced tracks on the note;

means for dividing each read signal by the average of the read signals for its track to generate a plurality of relative reflectance signals corresponding to each track;

means for storing acceptance band data for the type of currency note to be validated, the predetermined acceptance band data consisting of upper and lower limits for the relative reflectance signals corresponding to preselected sample areas for each of the tracks;

means for comparing selected ones of the relative reflectance readings corresponding to preselected sample areas for each track to the acceptance band data and for determining if the relative reflectance readings fall within the upper and lower limits for that sample area, means for longitudinally shifting the locations of the selected ones of the relative reflectance readings a predetermined number of positions to generate an alternate set of selected relative reflectance readings corresponding to each track, means for comparing the alternate set of selected relative reflectance readings to the acceptance band data and for determining if the alternate relative reflectance readings fall within the upper and lower limits for that sample area, and means for providing a validation signal if less than a predetermined number of the selected ones of the relative reflectance readings or the alternate set of selected relative reflectance readings fall outside their corresponding upper and lower limits.

5. An apparatus according to claim 4 and further comprising:

means for taking a plurality of optical opacity readings along a longitudinally extending track on the note;

means for storing acceptance data for the opacity of the type of currency note to be validated; and means for comparing the optical opacity readings to the acceptance data for the opacity and for providing a validation signal if there is less than a predetermined maximum amount of nonconformity.

6. An apparatus according to claim 5 and further comprising:

means for measuring the length of the note; and means for providing a validation signal if the length of the note is acceptable.

7. An apparatus according to claim 6 and further comprising:

means for determining a malfunction in the apparatus; and means for displaying an indication of the malfunction.

8. An apparatus according to claim 4 and further comprising:

means for taking a plurality of optical opacity readings along a longitudinally extending track on the note;

means for storing upper and lower acceptance limits for the opacity of the type of currency not to be validated; and means for comparing the average opacity reading to the upper and lower acceptance limits for the opacity and for providing a validation signal if the average opacity falls within the upper and lower limits for the opacity.

9. An apparatus according to claim 4, wherein said means for taking a plurality of optical reflectance readings comprises a plurality of emitter means spaced along the path for illuminating sample areas on a note, drive signal means for causing said emitter means to illuminate said sample areas, and detector means for detecting radiation reflected from said sample areas; the apparatus further including:

a plurality of reference surfaces each positioned along the path for illumination by corresponding ones of the emitter means;

means for sequentially pulsing the emitter means with the drive signal means when a note is not present in the transport means to cause the detector means to generate reference read signals;

means for storing predetermined reference signal ranges; and means for comparing the reference read signals to the reference signal ranges and for adjusting the amplitudes of the drive signal means so that the reference read signals fall within the reference signal ranges.

10. An apparatus for validating a currency note, comprising:

transport means for propelling the note along a longitudinally extending path;

a plurality of emitter means positioned at laterally spaced locations on the path for each illuminating a sample area on the note with radiation when pulsed with a drive signal;

a plurality of detector means for each sensing radiation reflected from a sample area illuminated by a corresponding one of the emitter means and for generating a read signal;

means for sequentially pulsing the emitter means with drive signals to cause each emitter means to illuminate the sample areas;

means for storing acceptance band data for the type of currency note to be validated;

means for comparing selected ones of the optical reflectance readings corresponding to each track to the acceptance band data, means for longitudinally shifting the locations of the selected ones of the read signals a predetermined number of positions to generate an alterante set of selected read signals corresponding to each track, means for comparing the alternate set of selected read signals to the acceptance band data, and means for providing a validation signal if there is less than a predetrmined maximum amount of nonconformity for the selected ones of the optical reflectance readings or for the alternate set of selected read signals;

a plurality of reference surfaces each positioned along the path for illumination by corresponding ones of the emitter means;

means for causing the illumination of the reference surfaces when a note is not present in the transport means to generate reference read signals;

means for storing predetermined reference signal ranges; and means for comparing the reference read signals to the reference signal ranges and for adjusting the amplitudes of the drive signals so that the reference read signals fall within the reference signal ranges.

* * * * *

UNITED STATES PATENT AND TRADEMARK OFFICE
CERTIFICATE OF CORRECTION

PATENT NO. : 4,587,434

DATED : May 6, 1986

INVENTOR(S) : JOHN R. ROES, BILLY B. WINKLES, GUY M. KELLY, WAYNE M. SPANI, DONALD W. SCHUSTER

It is certified that error appears in the above-identified patent and that said Letters Patent are hereby corrected as shown below:

Column 15, line 18, Claim 1, change "not" to --note--.

Column 15, line 49, Claim 1, after the word "optical", insert --opacity--.
Column 15, line 52, Claim 1, change "not" to --note--.
Column 17, line 15, Claim 8, change "not" to --note--.
Column 18, line 23, Claim 10, change "alterante" to --alternate--.
Column 18, line 27, Claim 10, change "predetrmined" to --predetermined--.

Signed and Sealed this

Seventh Day of October, 1986

[SEAL]

*Attest:*

DONALD J. QUIGG

*Attesting Officer* *Commissioner of Patents and Trademarks*